Patented Apr. 1, 1947

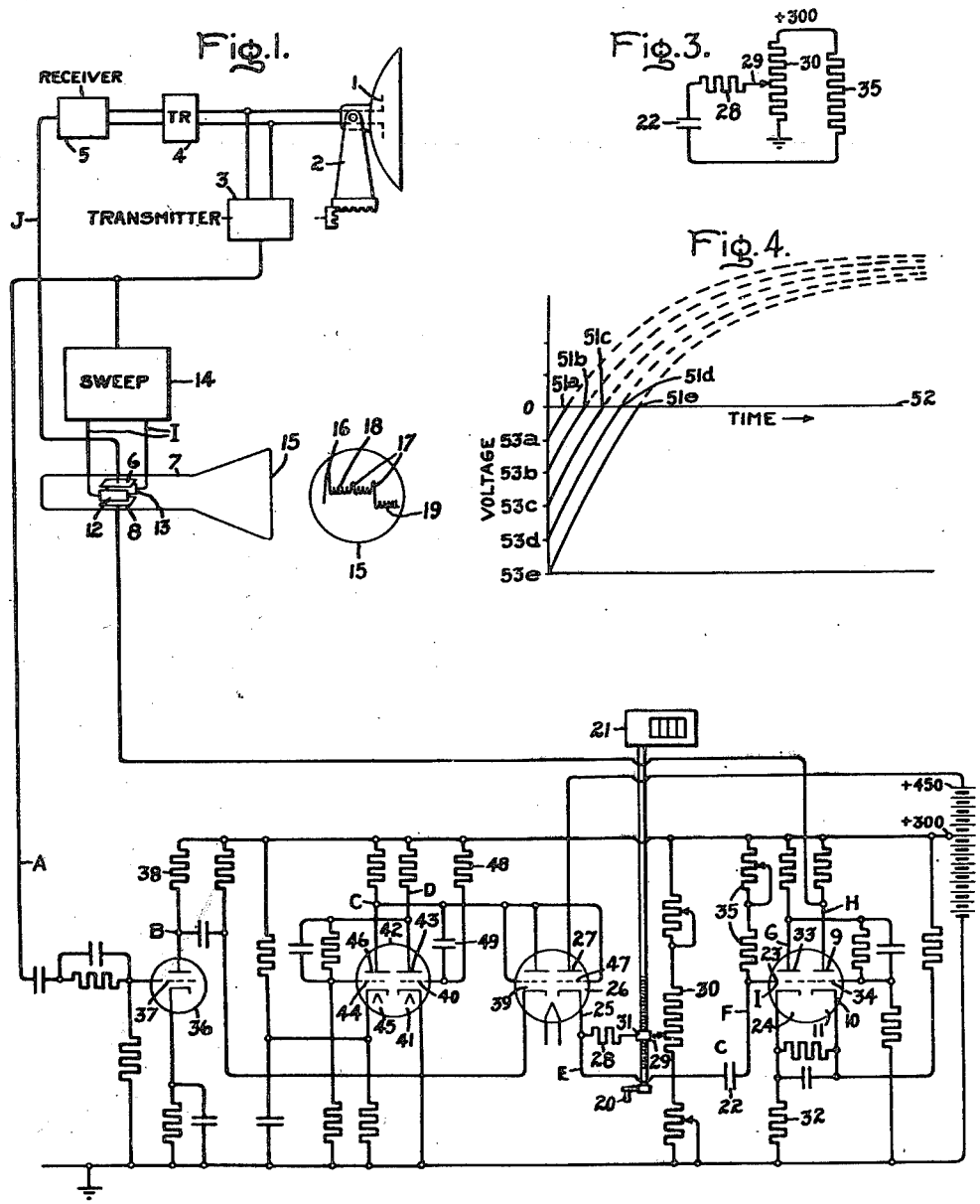

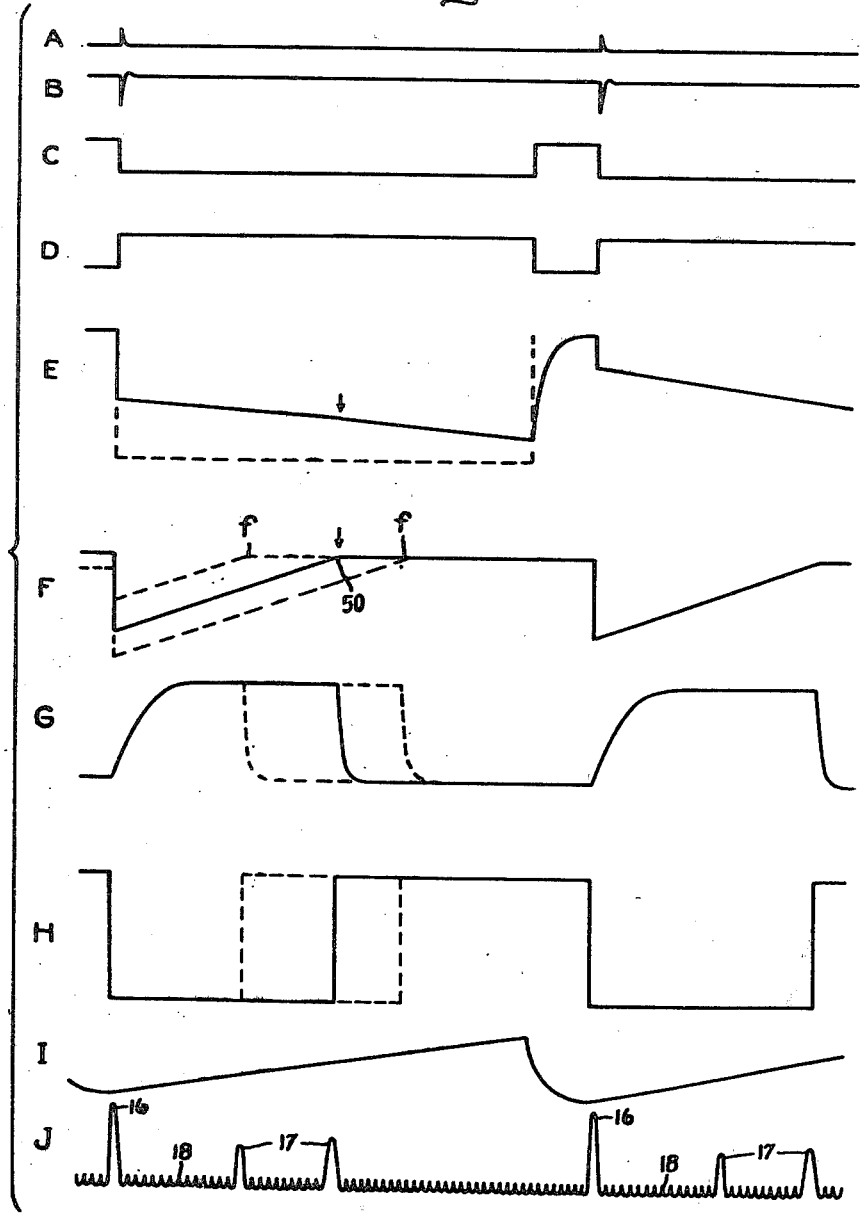

2,418,364

UNITED STATES PATENT OFFICE 2,418,364

LOCATING EQUIPMENT

Robert E. Moe, Bridgeport, Conn., assignor to General Electric Company, a corporation of New York Application May 29, 1944, Serial No. 537,955

4 Claims. (Cl. 161—15)

The present invention relates to locating equipment of the type in which the range of remote objects is determined from the time of travel of pulses of wave energy.

An object of my invention is to provide an arrangement for precisely indicating the range of a selected object which has a linear scale unaffected by variations in the voltage in the power supply.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 is a circuit diagram; Fig. 2 is a diagram illustrating the operation; Fig. 3 is a diagram of the charging circuit for the timing condenser; and Fig. 4 is a diagram of the charging condenser.

Referring to the drawing, there is shown radio locating equipment having a directional antenna system 1 mounted for orientation in azimuth and elevation on a pedestal 2 and connected to a pulse transmitter 3 for transmitting directional pulses of waves at the desired repetition rate which may be variable over a wide range (e. g., 60–1000 pulses per second). The reflections or echoes of the transmitted pulses from remote objects in the path of the transmitted pulses return to the antenna system at intervals dependent upon the range of the objects. The echoes are supplied through a TR box 4 to a receiver 5 having its output connected to one of the vertical plates 6 of a cathode ray tube 7. The TR box prevents damage to the receiver by the transmitted pulses without substantially interfering with the reception of the echoes which obviously are of much smaller magnitude. The other vertical plate 8 of the cathode ray tube is connected to the anode 9 of a device 10 forming part of a multivibrator 11. The horizontal plates 12 and 13 of the cathode ray tube are connected to a saw-tooth sweep circuit 14 keyed by the transmitter to apply a saw-tooth voltage (indicated at line I in Fig. 2) to the horizontal plates which starts at a minimum with each transmitted pulse and increases to a maximum just prior to a succeeding transmitted pulse. The saw-tooth voltage applied to the horizontal plates causes a horizontal trace on the viewing screen 15 of the cathode ray tube, starting at the left with the transmitted pulse and progressing across the screen at a constant rate to provide a time or range scale. The horizontal trace is modulated by the receiver output providing a deflection 16 synchronous with the transmitted pulse which marks the zero range and by deflections 17 corresponding to echoes from remote objects. The receiver also responds to noise voltages which produce the ragged deflections 18.

While the viewing screen provides an indication of the range of remote objects there is need for a more precise indication. This is obtained by an arrangement which turns the device 10 on synchronously with the transmitted pulses and off at a known interval thereafter, causing an abrupt change in the voltage between the vertical plates 6 and 8 due to the change in voltage at the anode 9. The effect of turning the device 10 off is to make the lower plate 8 more positive, displacing the horizontal sweep trace downward as indicated at 19. The time at which the device 10 is turned off is controlled by a hand crank 20 connected to an indicator 21 showing the range corresponding to the downward shift of the horizontal sweep trace. To determine the precise range of an object corresponding to one of the deflections 17, the operator turns the hand crank 20 until the downward shift of the horizontal sweep trace coincides with the deflection. The range is then read on the indicator 21.

The time at which the device 10 is turned off is determined by the charging of a condenser 22 having its low side connected to the grid 23 of a device 24 forming the normally conducting half of the multivibrator 11 and having its high side connected to the cathode 25 of a normally conducting device 26. The anode 27 of the device 26 is connected to a high voltage tap (450 volts) on the power supply. The cathode 25 is connected through resistance 28 to a slider 29 on a potentiometer 30 connected between a lower voltage tap (300 volts) on the power supply and ground. The position of the slider 29 is controlled by the hand crank 20 through a screw and nut 31. When the device 26 is conducting, the high side of the condenser 22 is held substantially at the voltage of the lower voltage tap on the power supply and the low side of the condenser 22 is held (by current flowing to the grid 23) at a voltage slightly above ground determined by the cathode resistor 32. When the current through the device 26 is interrupted, the voltage at the high side of the condenser 22 is suddenly dropped to the value determined by the position of the slider 29, and, due to the charge on the condenser, the grid 23 is driven negative by an amount determined by the difference between the charge on the condenser and the voltage at the slider. The negative drive on the grid 23 causes the interruption of the current through the device 24 which results in a sudden increase in voltage at the anode 33. This voltage is applied to the grid 34 of the device 10, turning the device 10 on and resulting in the sudden drop in voltage applied to the vertical deflection plate 8. The device 24 remains cut off until the condenser 22 charges in the opposite sense through a charging resistance 35 until the voltage at the low side of the condenser is sufficiently positive to turn the device 24 on and produce a sudden drop in voltage at its anode 33 which cuts the device 10 off. The point at which the device 10 is cut off determines the downward shift of the sweep trace indicated at 19.

The charging time of the condenser 22 has a very nearly linear relation with the position of the slider substantially independent of variations in the power supply because the variations in the voltage of the power supply cause corresponding variations in the negative drive on the grid 23 upon interruption of current through the device 26 and the same sort of variations in the charging current for the condenser. The absolute magnitude of the power supply voltage, therefore, has only a small effect upon the charging time. The charging time is also affected to a certain extent by the resistance 28.

The range indicator is synchronized with the transmitted pulses (so that the range is always timed from the transmitted pulses) by an amplifier 36 having a grid 37 connected to receive positive pulses coincident with the transmitted pulses. The amplifier output which appears across a plate resistor 38 consists of synchronous negative pulses which are coupled through a diode 39 to the grid 40 of a device 41 forming the normally conducting half of a multivibrator 42. The device 41 is accordingly driven to cut-off synchronously with each transmitted pulse, causing a rise in voltage at its anode 43 which is coupled to the grid 44 of a device 45 forming the other half of the multi-vibrator. The rise in voltage at the grid 44 turns the device 45 on and results in a negative voltage at its anode 46 which is coupled to the grid 40 to hold the device 41 off and is also coupled to the grid 47 of the device 26, driving it to cut-off and initiating the range timing. The device 41 remains cut off for an interval determined by a resistance 48 and a condenser 49 connected between the anode 46 and the positive side of the power supply.

At the instant of cut-off of the device 41, the condenser 49 starts charging through the resistance 48 in a sense to make the grid 40 more positive. When the grid becomes sufficiently positive, the device 41 conducts and the resultant negative voltage of the anode 43 drives the device 45 to cut-off. The interval during which the device 41 remains cut off (the timing interval) starts with the transmitted pulse and ends some time before a succeeding transmitted pulse. The duration of the timing interval is greater than the time required for the reception of echoes from objects at the maximum range but less than the interval between the transmitted pulses. When the device 41 is turned on at the end of this interval, the positive voltage from the anode 46 turns the device 26 on and causes the recharging of the condenser 22, placing it in readiness for range timing.

The operation is illustrated in Fig. 2 in which line A represents the transmitted pulses applied to the amplifier 36, and line B represents the amplifier output applied through the diode 39 to the grid 40 of the device 41 to trigger the multivibrator 42. Upon triggering of the multivibrator, a square wave voltage indicated at line C appears at the anode 46 and a mirror image of line C indicated at line D appears at the anode 43. The voltage at the anode 46 is coupled to the grid 47 of the device 26, driving the device to cut-off for the duration of the negative part of the voltage (the timing interval). The interruption of current through the device 26 ties the high side of the range timing condenser 22 to the slider 29. Immediately prior to the instant of interruption of current through the device 26, the high side of the condenser was held at substantially 300 volts and the low side of the condenser was held at the potential of the grid 23 (substantially ground). Since the slider 29 is connected to an adjustable point on a potentiometer 30 across the 300-volt tap on the power supply, the grid 23 is driven negative by the difference between the voltage of the condenser 22 and the voltage between the slider 29 and the lower end of the potentiometer. The negative voltage applied to the grid 23 drives the device 24 of the multivibrator 11 to cut-off, producing at the anode 33 a square wave voltage indicated at line G of Fig. 2 and producing a complementary square wave voltage at the anode of the device 10 indicated in line H of Fig. 2. The voltage at the anode of the device 10 is connected to the vertical deflection plate 8 of the cathode ray tube and results in positioning of the beam of the cathode ray tube on the upper part of the stepped trace indicated on the viewing screen 15. For the duration of the negative part of the voltage indicated in line H of Fig. 2, the transmitted pulse 16, the noise voltages 18, and any echoes 17 from remote objects appear on the upper part of the stepped trace and the distance between the echoes 17 and the transmitted pulse 16 serves as a measure of the range of the object. Simultaneously with the interruption of the current through the device 26 the range timing condenser 22 starts to charge through the resistances 35 and 28 in a sense to bring the accumulated charge on the condenser to a value equal and opposite to the voltage between the slider 29 and the upper end of the potentiometer 30. The charging of the condenser is illustrated in Fig. 3 for two positions of the slider 29. It will be noted that the voltage at the low side of the condenser starts from a negative value equal to the difference between the voltage at the high side of the condenser and the voltage between the slider 29 and the lower end of the potentiometer and increases substantially linearly until the voltage is equal to the voltage applied to the grid 23 necessary to turn the device 24 on. If the condenser were not connected to the grid 23, the condenser would charge exponentially toward the voltage of the power supply (300 volts). Due to grid current, however, the condenser is held at a voltage slightly above ground determined by the cathode resistor 32. The value of grid voltage necessary to turn the device 24 on is indicated as a horizontal line in Fig. 3 and the intersection of the condenser voltage with this line varies substantially linearly with the position of the slider 29. As soon as the device 24 is turned on, the voltage at the anode 33 suddenly drops, applying a cut-off bias to the grid 34 of the device 10 and causing the anode of the device 10 to be more positive, resulting in the sudden lowering of the sweep trace to the level indicated at 19.

To determine the range of an object indicated by one of the deflections 17, the operator adjusts the slider 29 by the hand crank 20 until the shifting of the sweep trace to the lower level 19 coincides with the deflection 17. The range can then be read directly from the indicator 21. The voltage at the grid 23 is indicated in line F of Fig. 2 in which the point 50 represents the intersection voltage at the low side of the condenser 22 with the value of grid voltage necessary to turn the device 24 on. Representative curves for other adjustments of the potentiometer 29 are illustrated in dotted lines in line F, and the corresponding effect on the voltages of the multivibrator 11 is indicated in dotted lines in lines G and H.

The range timing indication represented by the shifting of the sweep trace of the cathode ray tube to the lower level indicated at 19 is determined by the time required for the range timing condenser 22 to charge through resistances 35 and 28 to a percentage of the difference between its initial voltage and the voltage of the slider 29. If only the resistance 35 were present, the range timing would be linearly related to the position of the hand wheel 20 to within one per cent from minimum to maximum range (e. g., from 100 to 30,000 yards). Since the condenser voltage is expressed in a percentage of the power supply voltage, the range timing is unaffected by variations in voltage in the power supply. From an inspection of Fig. 4 showing the timing condenser charging curves for various adjustments of the slider 29, it will be noted that each curve has the same slope at the intersections 51a, 51b, 51c, 51d, and 51e with the horizontal line 52 representing the grid voltage at which the device 24 becomes conductive. This is what would be expected since at each of these points the condenser has an identical charge. It has been found that the ratios of the ordinates from the starting points 53a, 53b, 53c, 53d, and 53e to the horizontal line 52 are very nearly linearly related to the abscissae to the intersections with the condenser charging curves. This is due to the fact that the initial voltage on the condenser is changed with each position of the slider. The linearity is much greater than would be obtained by using a fixed initial voltage on the condenser and by varying the voltage corresponding to the line 52 with the slider position. As shown in Fig. 3, the resistance 28 and the resistance of the potentiometer 30 form part of the charging circuit for the timing condenser. The effective value of this resistance varies with the position of the slider 29 and the effect is to decrease or compensate for the variation from linearity in the charging time with the slider position.

After the range timing indication the voltage at the high side of the condenser 22, indicated in line E of Fig. 2, continues to drop until capacitor 22 is completely discharged to the potential of the slider 29. At the end of the timing interval, the device 41 of the multivibrator 42 is turned on and the device 45 is turned off. At this point a positive voltage is applied to the grid 47 of the device 26, biasing the device on and recharging the condenser 22. The recharging of the condenser takes only a few microseconds so the range timing circuit is suitable for use with high pulse rates. No adjustments are necessary over a wide range of pulse rates (e. g., 60–1000 pulses per second).

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States is:

1. In a timing circuit, a condenser having its high side connected to a power supply through a normally conducting discharge device and through a tap on a potentiometer and having its low side connected to the power supply through a charging resistance and connected to the grid of another normally conducting discharge device across the power supply, means for biasing said first device off whereby the grid of said second device is driven negative by an amount determined by the position of the tap on the potentiometer, biasing said second device off, said second device being subsequently biased on by the charging of the condenser, and means utilizing the time the second device is biased off for supplying a timing indication.

2. In a timing circuit, a condenser having its high side connected to a power supply through a normally conducting discharge device and through an isolating resistance to a tap on a potentiometer across the power supply and having its low side connected to the power supply through a charging resistance and connected to the grid of another normally conducting discharge device across the power supply, means for biasing said first device off whereby the grid of said second device is driven negative by an amount determined by the position of the tap on the potentiometer, biasing said second device off, said second device being subsequently biased by the charging of the condenser through said resistance, and means utilizing the time the second device is biased off for supplying a timing indication.

3. In a timing circuit, a condenser having its high and low sides respectively connected to high and low sides of a power supply through normally conducting discharge devices, a potentiometer across the power supply having a tap connected to the high side of the condenser, a charging resistance connected between the high side of the power supply and the low side of the condenser, means for biasing said devices off, whereby the condenser charges in the opposite sense through the resistance and the tap on the potentiometer, and means utilizing the time required for the condenser to charge in the opposite sense to a predetermined value for supplying a timing indication.

4. In a timing circuit, a condenser having its high and low sides respectively connected to high and low sides of a power supply through a normally conducting discharge device and the grid of a second device forming the normally conducting half of a multivibrator, a potentiometer across the power supply having a tap connected to the high side of the condenser, a charging resistance connected between the high side of the power supply and the low side of the condenser, means for biasing said first device off whereby the grid of said second device is driven negative by an amount determined by the position of the tap on the potentiometer, biasing said second device off, a third device forming the other half of the multivibrator biased on when the second device is biased off, said second device being subsequently biased by the charging of the condenser, and means utilizing the output of the third device for supplying a timing indication.

ROBERT E. MOE.